Patented May 26, 1942

2,284,579

UNITED STATES PATENT OFFICE 2,284,579

VULCANIZATION OF RUBBER

Paul C. Jones, Akron, Ohio, assignor to The B. F. Goodrich Company, New York, N. Y., a corporation of New York No Drawing. Application April 25, 1940, Serial No. 331,640

12 Claims. (Cl. 260—785)

This invention relates to the vulcanization of rubber, and has as its principal object to provide a new vulcanizing agent.

It is well known that substituted thiuram polysulfides such as tetramethyl thiuram disulfide, tetraphenyl thiuram disulfide, and dipiperidyl thiuram tetrasulfide are valuable vulcanizing and accelerating agents. Rubber may be vulcanized in the presence of these substituted thiuram polysulfides in the absence of any other accelerator or vulcanizing agent. Unsubstituted thiuram disulfide, however, cannot be used in this manner. No cures are obtained when rubber compositions containing thiuram disulfide are heated at normal vulcanizing temperatures for normal times either in the presence of or in the absence of added free sulfur.

I have discovered that in compositions containing a non-reverting accelerator, thiuram disulfide may be employed as the vulcanizing agent to produce compositions having excellent resistance to deterioration. Non-reverting accelerators are those materials which cause vulcanizates to retain much of their tensile strength but to become non-extensible when overcured. Reverting accelerators cause vulcanizates to lose their tensile strength and increase in elongation when overcured. In general, overcured vulcanizates containing reverting accelerators resemble crude rubber, while those containing non-reverting accelerators resemble hard rubber. Amine accelerators are in general reverting, while non-reverting accelerators are characterized by the group

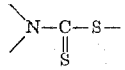

or

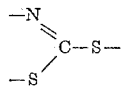

Thiuram disulfides do not yield vulcanizates which age well when used in conjunction with reverting accelerators.

The age-resisting vulcanizates of this invention are formed by employing thiuram disulfide as a vulcanizing agent in conjunction with a non-reverting accelerator such as 2-mercapto-4,5-dimethylthiazole, 2-mercapto-4-ethylthiazole, 2-mercaptothiazoline, the zinc salt of 2-mercaptobenzothiazole, diethylamino 4,5-dimethylthiazyl sulfide, di-4,5-dimethylthiazyl disulfide, dibenzothiazyl disulfide, tetramethyl thiuram monosulfide, tetramethyl thiuram disulfide, dipiperidyl thiuram tetrasulfide, zinc dimethyl dithiocarbamate, dinitrophenyl dimethyldithiocarbamate, etc., in the absence of any added free sulfur. Thiuram disulfide is ordinarily employed in proportions equal to or somewhat greater than the proportions of sulfur which would normally be employed in vulcanizing the same compositions.

As a specific example of the use of thiuram disulfide as a vulcanizing agent, the following compositions were prepared:

| Composition | 1 | 2 | 3 | 4 | 5 | 6 |
|---|---|---|---|---|---|---|
| Rubber | 100 | 100 | 100 | 100 | 100 | 100 |
| Zinc oxide | 5 | 5 | 5 | 5 | 5 | 5 |
| Stearic acid | 1 | 1 | 1 | 1 | 1 | 1 |
| Thiuram disulfide | 3 | 3 | 3 | 5 | 5 | 5 |
| Tetramethyl thiuram monosulfide | 1 | 0 | 0 | 0 | 0 | 0 |
| Tetramethyl thiuram disulfide | 0 | 1 | 0 | 0 | 0 | 0 |
| Mercaptoalkylthiazoles* | 0 | 0 | 1 | 0 | 0 | 0 |
| Di-4,5-dimethylthiazyl disulfide | 0 | 0 | 0 | 2 | 0 | 0 |
| Di-4,5-dimethylthiazyl tetrasulfide | 0 | 0 | 0 | 0 | 2 | 0 |
| Diethylamino 4,5-dimethylthiazyl sulfide | 0 | 0 | 0 | 0 | 0 | 2 |

*A mixture of approximately 80 parts of 2-mercapto-4,5-dimethylthiazole and 20 parts of 2-mercapto-4-ethylthiazole.

These compositions were vulcanized by heating in a mold for varying times at 287° F. and aged for 96 hrs. in a Bierer-Davis oxygen bomb at 158° F. under 300 lbs./in.² of oxygen to determine the resistance of the vulcanizates to aging. The results obtained are reproduced in the following table, T representing tensile strength in lbs./in.² and E representing the ultimate elongation in per cent:

| Composition | Min. cure at 287° F. | Original samples | | Aged samples | |
|---|---|---|---|---|---|
| | | T | E | T | E |
| 1 | 15 | 2,450 | 895 | 1,965 | 740 |
| 1 | 60 | 2,345 | 905 | 1,515 | 730 |
| 2 | 15 | 2,480 | 855 | 2,015 | 735 |
| 2 | 60 | 2,115 | 855 | 1,540 | 730 |
| 3 | 60 | 2,310 | 865 | 1,675 | 785 |
| 4 | 30 | 2,750 | 775 | 2,060 | 730 |
| 5 | 30 | 2,615 | 870 | 1,965 | 740 |
| 6 | 30 | 3,050 | 810 | 2,155 | 710 |

Although the above compositions contained no antioxidant, the vulcanizates only lost from about ¼ to ⅓ their tensile strengths and elongations in the severe aging test to which they were subjected. Vulcanizates containing no antioxidant ordinarily fail completely in 96 hrs. in an oxygen bomb.

Although the invention has been described in detail in connection with a specific rubber composition, it will be evident that this invention is applicable to rubber compositions of the most varied nature, and that all manner of rubber goods including pneumatic and solid rubber tires, tubes, hose, electrical insulation, belting, packing, boots and shoes, surgical rubber goods, seamless dipped rubber articles, etc. may be vulcanized in the presence of the vulcanizing agent herein described. The materials of this invention may be incorporated in rubber by mastication, milling, or any similar process, or in the case of latex, rubber cement, or any other natural or artificial dispersion or solution of rubber by simply suspending or dissolving the materials therein.

The vulcanization may be performed in other manners than that particularly set forth in the specific examples; specifically, rubber compositions may be heated in hot air, steam, hot water, etc.

It is to be understood that the term "a rubber" is employed in the appended claims in a generic sense to designate rubbery materials capable of vulcanization when heated with sulfur and includes caoutchouc, balata, gutta percha latex, rubber isomers, or synthetic rubber of the types capable of vulcanization when heated with sulfur whether or not admixed with pigments, fillers, softeners, antioxidants, etc.

While I have herein disclosed specific embodiments of my invention, I do not intend to limit the invention solely thereto, for it will be obvious to those skilled in the art that many modifications such as using other materials having equivalent properties and varying the proportions of materials used are within the spirit and scope of the invention as defined in the appended claims.

I claim:

1. The method which comprises vulcanizing a rubber in the presence of a non-reverting accelerator and thiuram disulfide in the absence of added free sulfur.

2. The method which comprises vulcanizing a rubber in the presence of a non-reverting accelerator and thiuram disulfide as the sole vulcanizing agent added to the composition.

3. The method which comprises vulcanizing a rubber in the presence of a mercaptoalkylthiazole and thiuram disulfide in the absence of added free sulfur.

4. The method which comprises vulcanizing a rubber in the presence of 2-mercapto-4,5-dimethylthiazole and thiuram disulfide in the absence of added free sulfur.

5. The method which comprises vulcanizing a rubber in the presence of tetramethyl thiuram monosulfide and thiuram disulfide in the absence of added free sulfur.

6. The method which comprises vulcanizing a rubber in the presence of tetramethyl thiuram disulfide and thiuram disulfide in the absence of added free sulfur.

7. The method which comprises vulcanizing a rubber in the presence of a non-reverting accelerator containing the

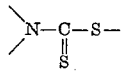

group and thiuram disulfide in the absence of added free sulphur.

8. The method which comprises vulcanizing a rubber in the presence of a non-reverting accelerator containing the

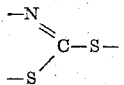

group and thiuram disulfide as the sole vulcanizing agent added to the composition.

9. A rubber composition comprising a rubber which has been vulcanized in the presence of a non-reverting accelerator and thiuram disulfide in the absence of added free sulfur.

10. A rubber composition comprising a rubber which has been vulcanized in the presence of a mercaptothiazole and thiuram disulfide in the absence of added free sulfur.

11. A rubber composition comprising a rubber which has been vulcanized in the presence of 2-mercapto-di-4,5-dimethylthiazole and thiuram disulfide in the absence of added free sulfur.

12. A rubber composition comprising a rubber which has been vulcanized in the presence of tetramethyl thiuram monosulfide and thiuram disulfide in the absence of added free sulfur.

PAUL C. JONES.